United States Patent
Suzuki et al.

(10) Patent No.: US 6,251,484 B1
(45) Date of Patent: *Jun. 26, 2001

(54) APPLICATION METHOD

(75) Inventors: Akihiro Suzuki; Norio Shibata; Shinsuke Takahashi; Mikio Tomaru, all of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/306,584

(22) Filed: Sep. 15, 1994

(30) Foreign Application Priority Data

Oct. 19, 1993 (JP) ................................. 5-283831

(51) Int. Cl.⁷ ..................................................... B05D 1/36
(52) U.S. Cl. .................... 427/358; 427/129; 427/131; 427/356; 118/410; 118/411
(58) Field of Search .................... 427/131, 129, 427/356, 358; 118/410, 411

(56) References Cited

U.S. PATENT DOCUMENTS

| 4,537,801 | * | 8/1985 | Takeda | 427/358 |
| 4,907,530 | | 3/1990 | Shibata et al. | 118/410 |
| 4,927,665 | | 5/1990 | Chino et al. | 427/131 |
| 4,963,433 | * | 10/1990 | Ogawa et al. | 427/131 |
| 4,968,528 | | 11/1990 | Tanaka et al. | 427/131 |
| 5,032,428 | * | 7/1991 | Ogawa et al. | 427/131 |

* cited by examiner

*Primary Examiner*—Katherine A. Bareford
(74) *Attorney, Agent, or Firm*—Sughrue, Mion, Zinn, Macpeak & Seas, PLLC

(57) ABSTRACT

An application method of forming a precoat and at least one type of coat sequentially in a wet condition on an application face of a support with an extrusion type coating head of non-pressurizing type having a front edge 3 positioned in the upstream with respect to a move direction of the support and a back edge 4 positioned in the downstream with respect to the support move direction and having an acute-angle tip formed so as to recede in the direction opposite to the support from the tip of the front edge. The difference between values of solubility parameters at application temperature of solvents contained in both the precoat 70 and the coat 50 contiguous to the precoat is made 1.5 or less.

9 Claims, 1 Drawing Sheet

FIGURE  PRIOR ART
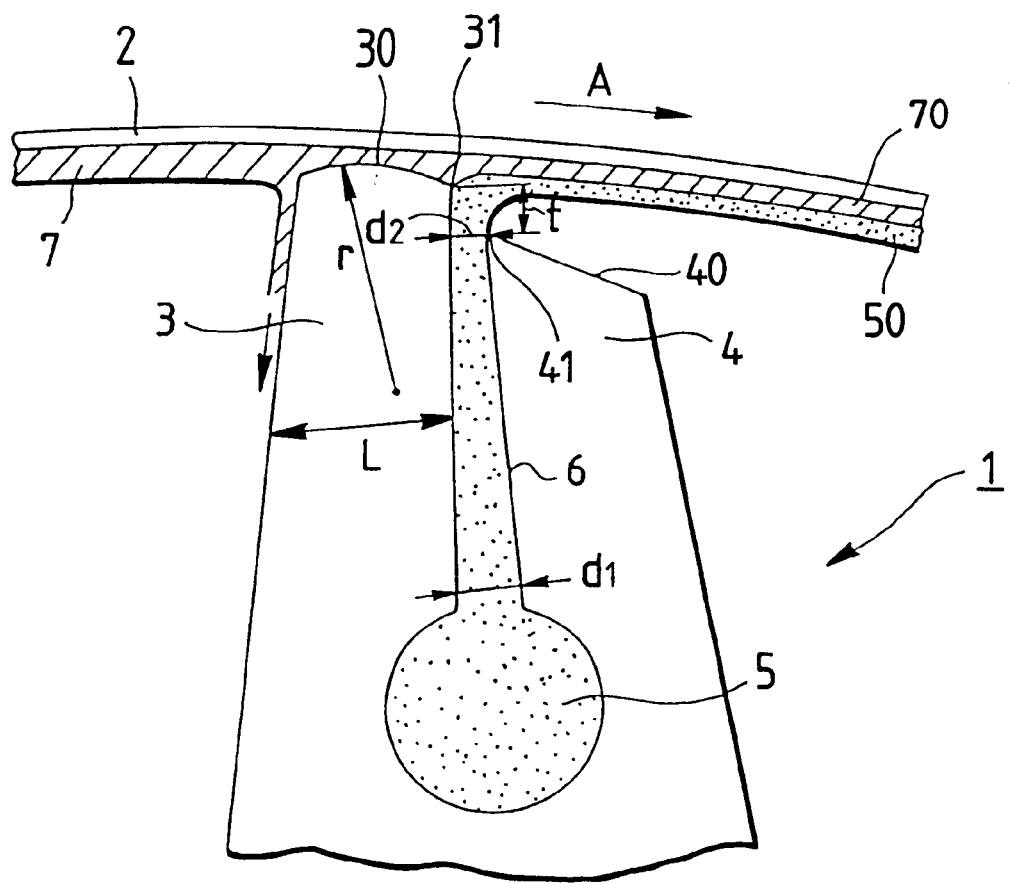

APPLICATION METHOD

BACKGROUND OF THE INVENTION

The present invention relates to a method of applying a coating fluid to the surface of a support and more particularly to a method of applying a solution comprising photo-sensitive material, magnetic material, etc., dissolved in a solvent with an extrusion type coating head of non-pressurizing type.

One of conventional methods of manufacturing various types of photographic film, photographic paper, and magnetic recording media is to extrude a coating fluid comprising photo-sensitive material, magnetic material, treatments, etc., dissolved in a solvent such as an organic solvent from a slit of a coating head to the surface of a running long support for forming coats made of the materials on the support surface.

Since generally a multitude of coats are applied, the following two application methods are adopted: Wet on dry method by which application and drying steps are repeated for each coat to form multiple coats and wet on wet method by which as many coating heads as the number of coats are disposed along the move direction of a support or a coating head formed with as many slits as the number of coats is used to extrude coating fluid from the slits to the application face of the support at the same time and laminate the coats on each other in a wet condition. Of the two methods, the latter is useful because multiple coats can be formed consecutively.

The wet on wet application method is described in Japanese Patent Laid-Open Nos.Sho 61-139929 and 58-205561, for example. The application method described here is to press a coating head called an extruder (extrusion type coating head) against the application face of a running long support and extrude a coating fluid from a slit of the extruder for forming a coat on the support.

The wet on wet application method using the extruder mentioned above is a so-called pressurizing type application method of applying a coating fluid with the back edge of the extruder pressed against the support. However, since the coating fluid is pressed against the support on the back edge face in the pressurizing type application, the coating fluid may seep out in the width direction of the support, causing an uneven coating face to be formed.

To solve such a problem in the pressurizing type application and further enable high speed thin coat application, a non-pressurizing type extruder as described in Japanese Patent Laid-Open No.Sho 63-20069 has been developed, for example. As shown in the FIGURE, the non-pressurizing type extruder 1 comprises a front edge 3 positioned in the upstream with respect to the running direction of a support 2 (arrow A direction) and a back edge 4 positioned in the downstream and is provided with a level difference so that the tip 41 of the back edge 4 recedes from the tip 31 of the front edge 3 with respect to the support 2 (so that it is positioned upward in the FIGURE).

A coating fluid 5 is extruded toward the support 2 from a slit 6 defined by the front edge 3 and the back edge 4. At the time, the back edge 4 is out of contact with the support, so that the coating fluid 5 is applied without being subjected to smoothing action by the back edge face 40.

However, since the coating fluid 5 is out of contact with the support 2 in press condition in the application method using the non-pressurizing type extruder, which will be hereinafter called simply the non-pressurizing type application, air mixed from the front edge accompanying the application is not excluded when a coat is formed. Stripes will occur on the coating face or the coat thickness may change depending on the coating face condition of the support 2. Thus, normally a precoat solution 7 is used for a liquid seal.

For the liquid seal, the precoat solution 7 is previously applied to the application face of the support 2 in the upstream of the extruder 1 and when the support 2 arrives at the extruder 1, excessive precoat solution 7 is scraped out by the front edge 3 and the gap between the front edge face 30 and the support 2 is sealed with the precoat solution 7, thereby preventing air from being mixed into the coating fluid 5, flattening out the application face of the support 2 regardless of the surface condition thereof, and preventing excessive coating fluid pressurization from placing behavior of the coating fluid 5 out of order unexpectedly for improving high speed thin coat application performance. Further, dust adhering to the support 2 is taken into the precoat solution 7 and when arriving at the extruder 1, can be removed together with the excessive precoat solution 7 by the front edge 3. Foreign material is not trapped in the tip 41 of the back edge 4.

The coating fluid 5 is extruded from the slit 6 and laminated on a precoat 70 whose thickness is defined in passage through the front edge 3 for forming a coat 50. The effect of the precoat solution 7 as described above makes the coat 50 a good thin film free of stripes or thickness change. Therefore, the non-pressurizing type application method is extremely suitable particularly for high speed thin coat application.

By the way, the precoat solution 7 generally is a single organic solvent or a solution consisting essentially of an organic solvent containing a binder, etc., in order to improve adherence of the support 2 and the coating fluid 5 to each other. The precoat solution 7, which is removed from the support 2 after the coating fluid 5 is applied, preferably has higher volatility. Further, it is a component not contained in the final product and preferably is as inexpensive as possible.

In contrast, the coating fluid 5 is a solution comprising various substances including magnetic material, photo-sensitive material, etc., dissolved in an organic solvent. Thus, for the solvent contained in the coating fluid 5, a solvent having low volatility may have to be mixed or an expensive solvent may have to be used to uniformly dissolve or disperse all component substances contained in the coating fluid 5, for example, magnetic material, a binder, an antistatic agent, a lubricant additive, etc., in a magnetic coating fluid.

To manufacture multiitem products, often the type of coating fluid 5 is changed for application by using common equipment for reasons of facilities. In this case, often the coating fluid 5 only is changed and the same precoat solution 7 is used.

Thus, in many cases, the solvent contained in the precoat solution 7 differs from the solvent contained in the coating fluid. A chemical or physical affinity between the precoat solution 7 and coating fluid 5 may be lacked, causing a so-called "runaway phenomenon" to occur due to differences between the solvents contained in both the solution and fluid in polarity, density, surface tension, mutual solubility, etc., depending on a combination of the precoat solution and coating fluid.

Resultantly, adherence of the coating fluid 5 will lower and the coat film thickness will become uneven or the coat may flake off. Particularly, since the coating fluid 5 is applied via the precoat solution 7 inevitably in the non-pressurizing type application, solvent combinations must be sufficiently considered.

Proposals related to the "runaway phenomenon" were presented in Japanese Patent Laid-Open Nos.Hei 2-105331 and 3-119518. However, the contents disclosed here are applied to multiple magnetic coats and are related to the pressurizing type application of pressuring a coating fluid on the edge face as described above; they differ from the non-pressurizing application type to which the invention is applied in premise technique. An intensive research of the inventor and associates shows that the techniques disclosed in Hei 2-105331 and 3-119518 cannot be applied intact.

SUMMARY OF THE INVENTION

It is therefore an object of the invention to provide an application method capable of forming a coat free of stripes or film thickness change particularly if a non-pressurizing extruder is used by defining a combination of solvents contained in both a precoat solution and a coating fluid based on solubility parameters of the solvents contained in the solution and fluid to provide a good affinity therebetween.

The solubility parameters are an index indicating solubility of solvents, resin, high polymers, etc.; as they are close to each other in value, mutual solubility is raised. Focusing attention on this point, we applied coatings by making various combinations of solvents contained in precoat solution and coating fluid, and found that a high-quality coat free of stripes or film thickness change can be obtained when the difference between the value of the solubility parameter of a solvent contained in precoat solution at application temperature and the value of the solubility parameter of a solvent contained in coating fluid for forming a coat contiguous to a precoat is within a range of 0 to 1.5, more preferably 0 to 0.7, and the most preferably 0 to 0.2.

To the end, according to the invention, there is provided an application method of forming a precoat and at least one type of coat sequentially in a wet condition on an application face of a support with an extrusion type coating head of non-pressurizing type having a front edge positioned in the upstream with respect to a move direction of the support and a back edge positioned in the downstream with respect to the support move direction and having an acute-angle tip formed so as to recede in the direction opposite to the support from the tip of the front edge, wherein the difference between values of solubility parameters at application temperature of solvents contained in both the precoat and the coat contiguous to the precoat is made 1.5 or less.

BRIEF DESCRIPTION OF THE DRAWING

In the accompanying drawing:

The FIGURE is a schematic drawing of main parts of a non-pressurizing type extruder used in conventional embodiment and embodiment of the invention.

DESCRIPTION OF THE PREFERRED EMBODIMENTS

The solubility parameter ($\delta$) normally is defined by the following expression (1) or (2): (Either expression (1) or (2) may be adopted in the invention.)

$$\delta = (\Delta E/V)^{1/2} \tag{1}$$

$$\delta = [d(\Delta E - RT)/M]^{1/2} \tag{2}$$

where $\Delta E$ is molar evaporation heat of the solvent, V is the molar volume of the solvent, d is the density of the solvent, M is the molecular weight of the solvent, R is a gas constant, and T is absolute temperature. The molar evaporation heat ($\Delta E$) can be found by the following expression (3):

$$\Delta E = 23.7 Tb + 0.02 Tb^2 - 2950 \tag{3}$$

where Tb is the boiling point of the solvent.

Further, the $\delta$ value is corrected depending on the type of solvent. For example, for a ketone family solvent, 0.5 (boiling point 100° C. or less) is added; for an ester family solvent, 0.6 is added; and for an alcohol family solvent, 1.4 is added. For hydrocarbon solvents and ketone family solvents, the value found from the above-mentioned expression is used intact.

When the solvent is a mixture, the solubility parameter of the mixed solvent ($\delta_{mix}$) can be found by the following expression (4):

$$\delta_{mix} = (x_1 V_1 \delta_1 + \ldots + x_n V_n \delta_n)/(x_1 V_1 + x_2 V_2 + \ldots + x_n V_n) \tag{4}$$

where x is the molar fraction of the solvent and V is the molar volume of the solvent.

As seen in the definition of the molar volume of the solvent (V) or expression (2), the solubility parameter ($\delta$) depends on temperature. Although the solubility parameter ($\delta$) at a specific temperature is not defined in the invention, preferably the value at a temperature at which actual application is made, for example, at 20° C., is adopted on practical use.

In the invention, the solubility parameters of solvents contained in both a precoat solution and a coating fluid are found from the above-mentioned expressions and a combination of the solvents for satisfying the condition that the difference between the values of the solubility parameter ($\Delta\delta$) becomes 1.5 or less. This means that when one solvent is determined, the other solvent is adjusted so as to meet the condition or a solvent is selected for meeting the condition. Therefore, in the invention, particularly preferred solvents do not exist; in other words, all solvents may be adopted.

Normally, for solvents contained in coating fluids, the types of solvents used and their mix ratio are previously defined by experiments, etc., to uniformly dissolve or disperse all component substances. Thus, to make a combination of solvents satisfying the condition, it is advantageous to select or adjust a solvent contained in a precoat solution. At the time, if a single solvent cannot meet the condition, a mixed solvent may be prepared based on expression (4).

The invention, which defines the solvents contained in a precoat solution and a coating fluid, is not limited to specific types of coating fluids and is applied to various coating fluids including photo-sensitive material and magnetic coating fluids. Further, a multitude of coats may be formed, in which case only a precoat and the lowest coat contiguous to the precoat need to be considered.

Any coating equipment using a non-pressurizing type extruder as a coating head may be used in the invention, in which case the form or structure of the extruder is not limited. A special device need not be used to apply the precoat solution 7; known coaters, such as an air doctor, bar coater, blade coater, slide coater, rod coater, knife coater, roll coater, gravure coater, kiss coater, spray coater, and slot orifice coater, may be used. In addition, a method of pressing a wet cloth or the like or spouting a solution from a hollow like an injector needle can also be used.

As described above, according to the application method of the invention, a combination of a precoat solution and a coating fluid is defined so that the difference between the values of the solubility parameters of the solvents contained in both the precoat solution and coating fluid in non-pressurizing type application becomes 1.5 or less, thereby providing good affinity between the precoat solution and coating fluid; resultantly, occurrence of a runaway phenomenon can be suppressed for forming a uniform coating face free of stripes or film thickness change.

[Example]

The invention will be more clearly with reference to the following example:

Components in the composition listed in Table 1 were put into a ball mill and fully mixed and dispersed, then 10 parts by weight of epoxy resin (epoxy equivalent 500) were added and uniformly mixed and dispersed to generate a magnetic coating fluid (magnetic dispersion fluid).

Three types of mixed solvents with xylene, methyl isobutyl ketone, and n-butanol blended in the proportions listed in Table 2 were used as solvents. The solubility parameters δ of the mixed solvents are also listed in Table 2.

TABLE 1

| γ-Fe2O3 powder (needle-like particles having average | 100 parts by weight |

TABLE 2

| Solvent composition | | Coating fluid No. | | |
| --- | --- | --- | --- | --- |
| | | 1 | 2 | 3 |
| Xylene | X parts by weight | 240 | 30 | 30 |
| Methyl isobutyl ketone | Y parts by weight | 30 | 240 | 30 |
| n-butanol | Z parts by weight | 30 | 30 | 240 |
| Solubility parameter δ | | 9.02 | 8.74 | 10.84 |

When the viscosity of the magnetic coating fluid thus obtained was measured with a Rotovisko viscometer, a thixotropic viscosity characteristic was shown at each shear speed.

On the other hand, eight types of solvents as single solvents and mixed solvents with toluene, methyl ethyl ketone, cyclohexanone, hexane, dimethylformamide, and ethanol blended in the proportions listed in Table 3 were used for precoat solutions. The solubility parameters (δ) of the solvents are also listed in Table 3.

TABLE 3

| Solvent composition | Precoat solution No. | | | | | | | |
| --- | --- | --- | --- | --- | --- | --- | --- | --- |
| | 1 | 2 | 3 | 4 | 5 | 6 | 7 | 8 |
| Toluene parts by weight | 0 | 0 | 30 | 120 | 0 | 0 | 0 | 0 |
| Methyl ethyl ketone parts by weight | 30 | 80 | 90 | 0 | 0 | 0 | 0 | 0 |
| Cyclohexanone parts by weight | 90 | 40 | 0 | 0 | 120 | 0 | 0 | 0 |
| Hexane parts by weight | 0 | 0 | 0 | 0 | 0 | 120 | 0 | 0 |
| Dimethylformamide parts by weight | 0 | 0 | 0 | 0 | 0 | 0 | 120 | 0 |
| Ethanol parts by weight | 0 | 0 | 0 | 0 | 0 | 0 | 0 | 120 |
| Solubility parameter δ | 9.75 | 9.50 | 9.20 | 8.90 | 9.90 | 7.3 | 12.1 | 12.7 |

TABLE 1-continued

| particle diameter 0.5 μ in major axis direction, anti-magnetic force 320 oersted) | |
| --- | --- |
| Vinyl chloride-vinyl acetate copolymer (copolymer ratio 87:13, polymerization degree 400) | 10 parts by weight |
| Conductive carbon | 7 parts by weight |
| Polyamide resin (amine valence 300) | 5 parts by weight |
| Lecithin | 2 parts by weight |
| Silicone oil (dimethyl polysiloxane) | 1 parts by weight |
| Xylene | X parts by weight |
| Methyl isobutyl ketone | Y parts by weight |
| n-butanol | Z parts by weight |

Polyethylene terephthalate film 15 μm thick and 500 mm wide was used as a support.

The non-pressurizing type extruder shown in FIG. 1 was used for application. The dimensions of the extruder are as follows: The curvature of the front edge, r, is 1.5 mm, width L is 0.5 mm, the level difference between the front edge and back edge, t, is 0.10 mm, and slit widths $d_2$ and $d_1$ are 0.10 mm and 5.0 mm respectively. With the extruder, first a 4.0 μm thick coating of precoat solution in wet condition was applied to the support by the bar coater application method. Next, the precoat solution was scraped out by the front edge of the extruder so that the remaining thickness became 2.0 μm in wet condition, and a 15 μm thick coating of magnetic coating fluid in wet condition was applied under the conditions of application part tension 10 kg/500 mm wide and coating speed 600 m/min.

The combination of the coating fluid and the precoat solution was changed for application, and the coat face was evaluated in visual inspection.

The evaluation results are listed in Table 4.

TABLE 4

|  | Precoat solution 1 | Precoat solution 2 | Precoat solution 3 | Precoat solution 4 | Precoat solution 5 | Precoat solution 6 | Precoat solution 7 | Precoat solution 8 |
|---|---|---|---|---|---|---|---|---|
| Coating fluid 1 | ○ | ○ | ○ | ○ | ○ | ○ | x | x |
| Δδ | 0.73 | 0.48 | 0.18 | 0.12 | 0.88 | 1.72 | 3.08 | 3.68 |
| Coating fluid 2 | ○ | ○ | ○ | ○ | ○ | ○ | x | x |
| Δδ | 1.01 | 0.76 | 0.46 | 0.16 | 1.16 | 1.44 | 3.36 | 3.96 |
| Coating fluid 3 | ○ | ○ | Δ | x | ○ | x | ○ | x |
| Δδ | 1.09 | 1.34 | 1.64 | 1.94 | 0.94 | 3.54 | 1.26 | 1.86 |

The mark ○ in the tables denotes that a good coat free of uneven coating, stripes, etc., can be formed; Δ denotes that slight uneven coating or stripes occurred although there was no problem on practical use, and x denotes that uneven coating and stripes occurred frequently.

Table 4 also lists the difference (Δδ) between the values of the solubility parameters of the solvents contained in both the coating fluid and precoat solution together with the evaluation results. As seen in the table, a good coat face can be formed if the coating fluid and precoat solution are combined so that (Δδ) becomes approximately 1.5 or less.

What is claimed is:

1. An application method of sequentially forming a precoat and forming at least one coat in a wet condition on an application face of a support, in which said precoat and said coat contain different solvents and are formed with a non-pressurizing coating head, wherein a difference between solubility parameter values at application temperature of said different solvents contained in said precoat and said coat is less than or equal to 1.5.

2. An application method of sequentially forming a precoat and forming at least one coat in a wet condition on an application face of a support, in which said precoat and said coat contain different solvents and are formed with a non-pressurizing coating head having a front edge and a back edge respectively disposed upstream and downstream to one another with respect to a direction of movement of the support and forming a slot therebetween, in which the front edge and back edge each has a slot surface along said slot meeting a top surface opposite said support forming a front edge tip and back edge tip respectively, wherein the back edge tip forms an acute-angle tip, and the back edge tip recedes in a direction opposite to the support from the front edge tip, and wherein a difference between solubility parameter values at application temperature of said different solvents contained in said precoat and said coat is less than or equal to 1.5.

3. The method according to claim 2, wherein the difference between solubility parameter values at application temperature of solvents contained in said precoat and said coat is less than or equal to 0.7.

4. The method according to claim 2, wherein the difference between solubility parameter values at application temperature of solvents contained in said precoat and said coat less than or equal to 0.2.

5. The method according to claim 2, wherein the precoat and coat are formed contiguous to one another.

6. The method according to claim 2, wherein said solvent of said precoat is selected from a group consisting of toluene, cyclohexanone, hexane and dimethylformamide.

7. The method according to claim 2, wherein said solvent of said precoat are selected from a group consisting of toluene, methyl ethyl ketone, cyclohexanone, hexane, and dimethylformamide.

8. An application method of sequentially forming a precoat and forming at least one coat in a wet condition on an application face of a support, in which said precoat and said coat contain different solvents and are formed with a non-pressurizing coating head having a front edge and a back edge respectively disposed upstream and downstream to one another with respect to a direction of movement of the support and forming a slot therebetween, in which the front edge and back edge each has a slot surface along said slot meeting a top surface opposite said support forming a front edge tip and back edge tip respectively, wherein the back edge tip forms an acute-angle tip, and the back edge tip recedes in a direction opposite to the support from the front edge tip, and wherein a difference between solubility parameter values at application temperature of said different solvents contained in said precoat and said coat is less than or equal to 1.5, wherein said precoat consists of a single organic solvent.

9. The method according to claim 8 wherein said solvent of said precoat is selected from a group consisting of toluene, cyclohexanone, hexane and dimethylfonnamide.

* * * * *